United States Patent
Nagasaka et al.

(10) Patent No.: US 12,112,551 B2
(45) Date of Patent: Oct. 8, 2024

(54) VEHICLES, SYSTEMS AND METHODS FOR AUTOMATICALLY DETECTING A STATE OF SIGNAL LIGHTS OF A VEHICLE

(71) Applicant: Toyota Research Institute, Inc., Los Altos, CA (US)

(72) Inventors: Naoki Nagasaka, Aichi (JP); Blake Wulfe, San Francisco, CA (US); Kuan-Hui Lee, San Jose, CA (US); Jia-En Marcus Pan, Oakland, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 353 days.

(21) Appl. No.: 17/667,876

(22) Filed: Feb. 9, 2022

(65) Prior Publication Data
US 2023/0252799 A1 Aug. 10, 2023

(51) Int. Cl.
 *G06V 20/58* (2022.01)
 *G06T 7/254* (2017.01)

(52) U.S. Cl.
 CPC ............ *G06V 20/584* (2022.01); *G06T 7/254* (2017.01)

(58) Field of Classification Search
 CPC .............................. G06V 20/584; G06T 7/254
 See application file for complete search history.

(56) References Cited

U.S. PATENT DOCUMENTS

| | | |
|---|---|---|
| 9,928,432 B1 * | 3/2018 | Sathyanarayana ..... H04N 23/90 |
| 10,061,322 B1 | 8/2018 | Palefsky |
| 10,691,962 B2 | 6/2020 | Mei et al. |
| 10,875,528 B2 | 12/2020 | Shalev-Shwartz et al. |
| 2015/0125091 A1 * | 5/2015 | Gallo ........................ G06T 3/14 382/275 |

(Continued)

FOREIGN PATENT DOCUMENTS

| | | |
|---|---|---|
| CN | 111931715 A | 11/2020 |
| CN | 112419411 A | 2/2021 |

(Continued)

OTHER PUBLICATIONS

DeepSignals: predicting intent of drivers through visual signals (https://arxiv.org/pdf/1905.01333.pdf?utm_term), May 3, 2019.

(Continued)

*Primary Examiner* — Santiago Garcia
(74) *Attorney, Agent, or Firm* — DINSMORE & SHOHL LLP

(57) ABSTRACT

In one embodiment, a signal light state detection system includes one or more processors, an a non-transitory memory module storing computer-readable instructions. The computer-readable instructions are configured to cause the one or more processors to receive a first image of a vehicle and receiving a second image of the vehicle, wherein the second image is later in time from the first image, and generate a warped image from the first image and the second image, wherein the warped image has individual pixels of one of the first image and the second image that are shifted to locations of corresponding pixels of the other of the first image and the second image. The one or more processors further generate a difference image from the warped image and one of the first image and the second image, and determine, using a classifier module, a probability of a state of vehicle signal lights.

20 Claims, 4 Drawing Sheets

(56) References Cited

U.S. PATENT DOCUMENTS

| | | | | |
|---|---|---|---|---|
| 2018/0096595 A1* | 4/2018 | Janzen | | G06V 10/94 |
| 2020/0160126 A1* | 5/2020 | Malach | | G06F 18/217 |
| 2021/0327092 A1* | 10/2021 | Jiang | | H04N 13/239 |
| 2022/0011430 A1* | 1/2022 | Guo | | G01S 17/58 |
| 2022/0058453 A1* | 2/2022 | Malach | | G06N 3/04 |
| 2024/0020988 A1* | 1/2024 | Lyu | | G06V 20/584 |

FOREIGN PATENT DOCUMENTS

| | | |
|---|---|---|
| DE | 102018216871 A1 | 4/2020 |
| DE | 202020107031 U1 | 6/2021 |
| WO | 2020088766 A1 | 5/2020 |

OTHER PUBLICATIONS

Self-supervised learning of dense correspondence (https://www.cse.cuhk.edu.hk/lyu/_media/thesis/thesis_pengpengliu.pdf?id=students%3Aphd&cache=cache), Sep. 2020.

Image warping using local homography (https://pavancm.github.io/pdf/AIP_Final_Report.pdf), Apr. 23, 2017.

* cited by examiner

VEHICLES, SYSTEMS AND METHODS FOR AUTOMATICALLY DETECTING A STATE OF SIGNAL LIGHTS OF A VEHICLE

TECHNICAL FIELD

The present specification generally relates to autonomous vehicles and, more particularly, to vehicles, systems, and methods for automatically detecting a state of signal lights of other vehicles.

BACKGROUND

The ability to autonomously control a vehicle is central to applications ranging from improved advanced driver assistant services (ADAS) to mobility-as-a-service (e.g., autonomous vehicles). When navigating through an interactive traffic environment, the autonomously controlled vehicle should understand the intent of other vehicles. Because human drivers communicate their intent through turn signals, the autonomously controlled vehicle also should be able to recognize the turn signal state of other vehicles to infer intent of the drivers.

Accordingly, a need exists for vehicles, systems and methods for automatically detecting a state of signal lights of other vehicles.

SUMMARY

In one embodiment, a signal light state detection system includes one or more processors, an a non-transitory memory module storing computer-readable instructions. The computer-readable instructions are configured to cause the one or more processors to receive a first image of a vehicle and receiving a second image of the vehicle, wherein the second image is later in time from the first image, and generate a warped image from the first image and the second image, wherein the warped image has individual pixels of one of the first image and the second image that are shifted to locations of corresponding pixels of the other of the first image and the second image. The computer-readable instructions further cause the one or more processors to generate a difference image from the warped image and one of the first image and the second image, and determine, using a classifier module, a probability of a state of vehicle signal lights.

In another embodiment, a vehicle includes one or more processors, an a non-transitory memory module storing computer-readable instructions. The computer-readable instructions are configured to cause the one or more processors to receive a first image of a vehicle and receiving a second image of the vehicle, wherein the second image is later in time from the first image, and generate a warped image from the first image and the second image, wherein the warped image has individual pixels of one of the first image and the second image that are shifted to locations of corresponding pixels of the other of the first image and the second image. The computer-readable instructions further cause the one or more processors to generate a difference image from the warped image and one of the first image and the second image, and determine, using a classifier module, a probability of a state of vehicle signal lights.

In yet another embodiment, a method of detecting a state of vehicle signal lights includes receiving a first image of a vehicle and receiving a second image of the vehicle, wherein the second image is later in time from the first image, and generating a warped image from the first image and the second image, wherein the warped image has individual pixels of one of the first image and the second image that are shifted to locations of corresponding pixels of the other of the first image and the second image. The method further includes generating a difference image from the warped image and one of the first image and the second image, and determining, using a classifier module, a probability of a state of vehicle signal lights.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the appended figures, embodiments of the present disclosure are directed to vehicles, systems, and methods for automatically detecting the state of signal lights of vehicles on the road in proximity to an ego vehicle (i.e., the vehicle having the state of signal light detection functionality). Present systems and methods for detecting the state of signal lights (e.g., turn signal state and/or brake lights state) are computationally expensive and slow. As an example, methods using scale-invariant feature transforms (SIFT) are computationally expensive and slow because SIFT is an offline process and does not run in real-time. Further, to make SIFT effective in detecting signal lights, regions of interest of an image, such as the regions of the image surrounding the signal lights, must first be predetermined, which adds time to the calculation. Further, the determination of regions of interest may be difficult for less common vehicles, such as busses and trucks.

Embodiments of the present disclosure provide means for automatically detecting the state of signal lights (e.g., brake lights, left turn signal, right turn signal, hazard lights, and/or off) of other vehicles on the road that are faster and are less computationally expensive than previous methods. Particularly, embodiments do not rely on SIFT and the determination of regions of interest. Rather, embodiments use an optical flow calculation to map pixels of an image of a vehicle to corresponding pixels of a previous or subsequent image of the same vehicle. The mapping of pixels creates a warped image. The warped image and one of a previous image or a subsequent image is used to create a difference image. The difference image is then provided to a classifier module that calculates a probability of the signal light state. The signal light state having the highest probability may then be used to control the vehicle (e.g., drive control such as slow down, speed up, turn, and the like).

Various embodiments for automatically detecting vehicle signal light states are described in detail below.

Figure 1:
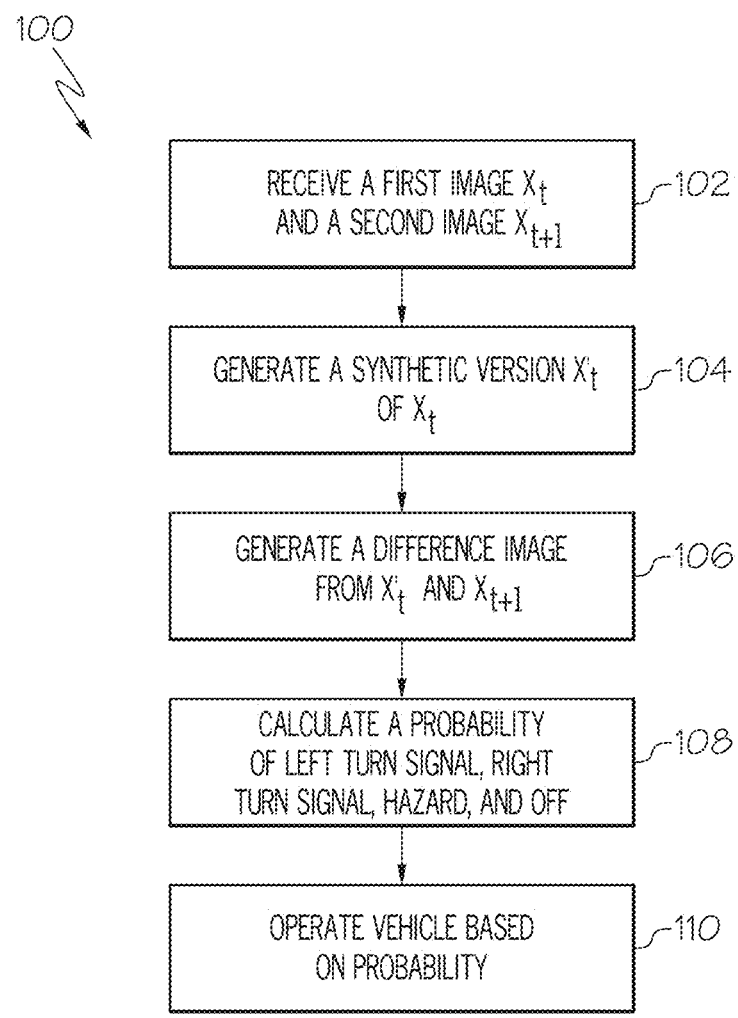
FIG. 1 schematically depicts a flowchart illustrating an example method of automatically detecting a state of a signal light of a vehicle according to one or more embodiments described and illustrated herein.

Referring now to FIG. 1, a flowchart 100 illustrating a non-limiting example of a method for automatically detecting a state of vehicle signal lights is shown. The type of states that may be detected include, but are not limited to, brake lights, right turn signal, left turn signal, hazard signal, no signal (i.e., off)). The method may be performed by vehicle components, or a device that is separate from a vehicle.

Figure 3:
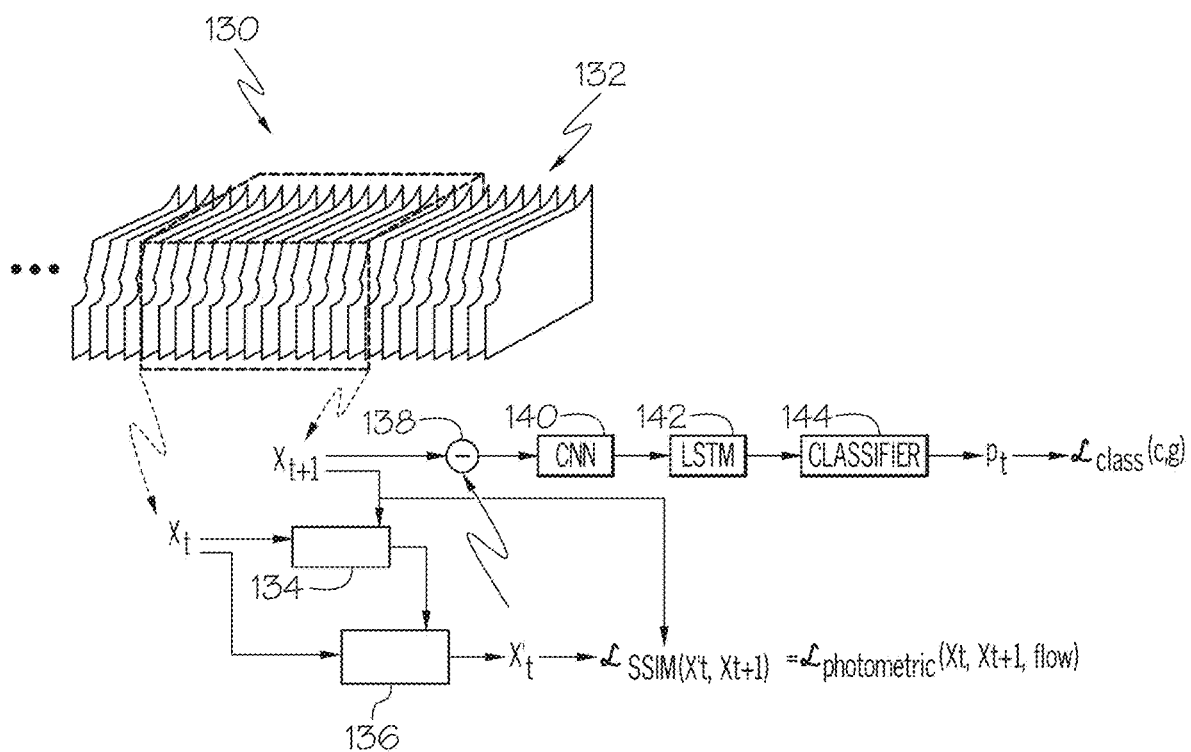
FIG. 3 schematically depicts a diagram of an example workflow for automatically detecting a state of a signal light of a vehicle according to one or more embodiments described and illustrated herein.

At block 102, a system (e.g., a vehicle system or a separate device/system) receives a first image $X_t$ generated at time t and a subsequent second image $X_{t+1}$ generated at time t+1. The first image and the second image may be generated by one or more on-board vehicle cameras. As another example, the first image and the second image may be generated by one or more cameras of a devices that is separate from the vehicle. The camera(s) may generate a series of images at a predetermined frequency (e.g., 10 Hz). Referring briefly to FIG. 3, a sequence 132 of images is shown. The camera(s) continuously generate images at the predetermined frequency. The first image $X_t$ and the second image $X_{t-1}$ are taken from the sequence 132 of images at a predetermined period. As a non-limiting example, there is 100 ms of time elapsed between time t and time t+1. However, embodiments are not limited by 100 ms.

Figure 2A:
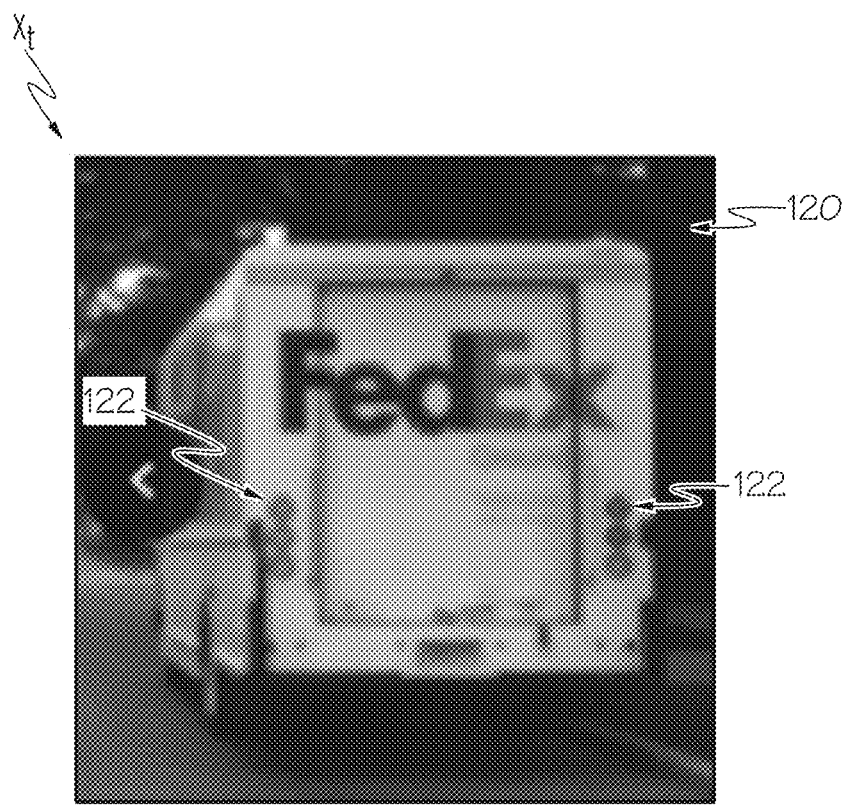
FIG. 2A is a first image of a vehicle according to one or more embodiments described and illustrated herein.
Figure 2B:
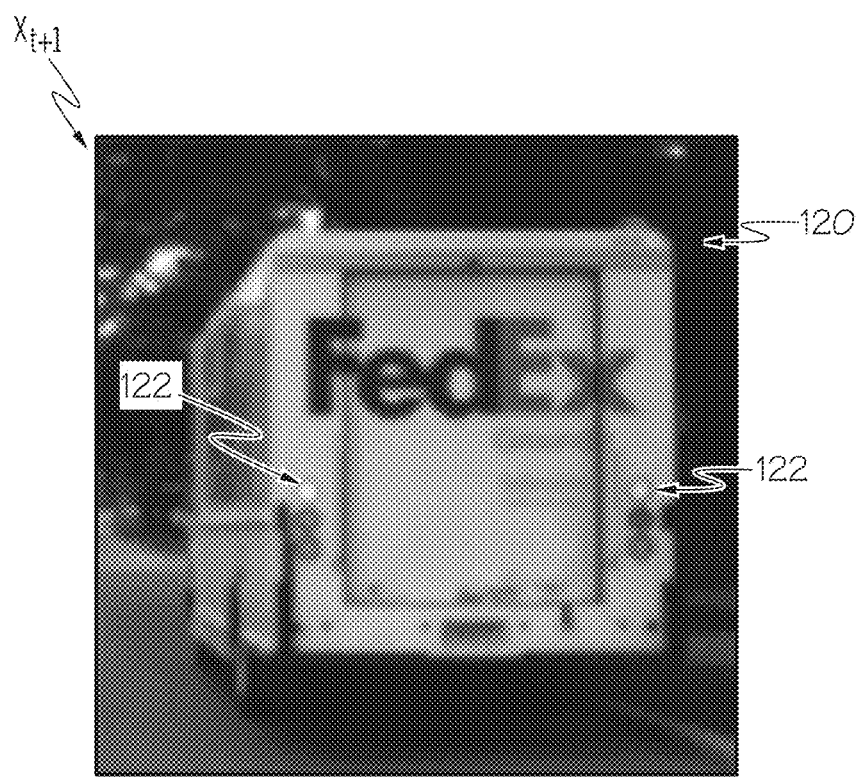
FIG. 2B is a second image of the vehicle of FIG. 2A according to one or more embodiments described and illustrated herein.

FIG. 2A illustrates a first image $X_t$ taken of a rear of a truck 120 at time t. As shown in FIG. 2A, at time $X_t$ the yellow turn signal lights 122 are off. FIG. 2B illustrates a second image $X_{t+1}$ of the same truck 120 at time t+1. As shown in FIG. 2B, both yellow turn signal lights 122 at time t+1 are on. To a human observer, this would indicate that the driver of the truck 120 has turned on the hazard lights to notify others surrounding the truck 120 to exercise caution. Embodiments of the present disclosure enable a vehicle or other device to automatically make the same determination.

Because the first image $X_t$ and the second image $X_{t+1}$ are taken at two points in time, the relative locations of the signal lights do not appear in the two dimensional location in the two images. For example, the distance between the ego vehicle and the other vehicle may have changed between time t and time t+1. Embodiments of the present disclosure warp one of the first and second image to the other so that their pixels are aligned with each other. Particularly, the pixels of the signal lights are in the same two-dimensional location within each image. In this manner, a difference image can be created.

Referring once again to FIG. 1, at block 104 of the flowchart 100 shown in FIG. 1, a synthetic version $X'_t$ of the first image $X_t$ and the second image $X_{t+1}$ is generated. It is noted that FIG. 1 illustrates that the synthetic version $X'_t$ is generated from the first image $X_t$; however, the synthetic version $X'_t$ could also be generated from the second image $X_{t+1}$.

The synthetic version $X'_t$ is a warped version of first image $X_t$ wherein the pixels of the first image $X_t$ are shifted to match the corresponding pixels of the second image $X_{t+1}$. As a non-limiting example, an optical flow process may be used to warp the first image $X_t$ (or second image $X_{t+1}$ in some embodiments). Referring to FIG. 3, an example process flow 300 for the method of the flowchart of FIG. 1 is illustrated. An optical flow module 134 and a meshgrid module 136 define a warping module. The optical flow module 134 and the meshgrid module 136 may be provided as two separate modules or a single module.

The optical flow module 134 receives the first image $X_t$ and the second image $X_{t+1}$ as input, and calculates an optical flow between the two images. The optical flow provides information on the movement of pixels between successive images. As a nonlimiting example, PWCNet, which is a convolutional neural network, may be used to calculate the optical flow for one of the images, such as the first image $X_t$. Thus, the output of the optical flow module 134 includes, for each pixel of the first image $X_t$ a direction and a magnitude of a position change to match the second image $X_{t+1}$. For example, a pixel of the first image $X_t$ may need to move 4 pixels in the x-direction and 7 in the y-direction to be aligned with the same pixel in the second image $X_{t+1}$.

The output of the optical flow module 134 is provided to the meshgrid module 136. The meshgrid module 136 also receives the first image $X_t$ as input. The meshgrid module 136 is operable to shift some or all pixels of the first image $X_t$ according to the information provided by the optical flow outputted by the optical flow module 134. In this manner a synthetic version $X'_t$ based on the first image $X_t$ is created.

Referring to block 106 of FIG. 1, a difference image between the second image $X_{t+1}$ and the synthetic version $X'_t$ of the first image $X_t$ is generated. FIG. 3 illustrates a difference module 138 that receives the second image $X_{t+1}$ and the synthetic version $X'_t$ of the first image $X_t$ and produces a difference image.

Figure 2C:
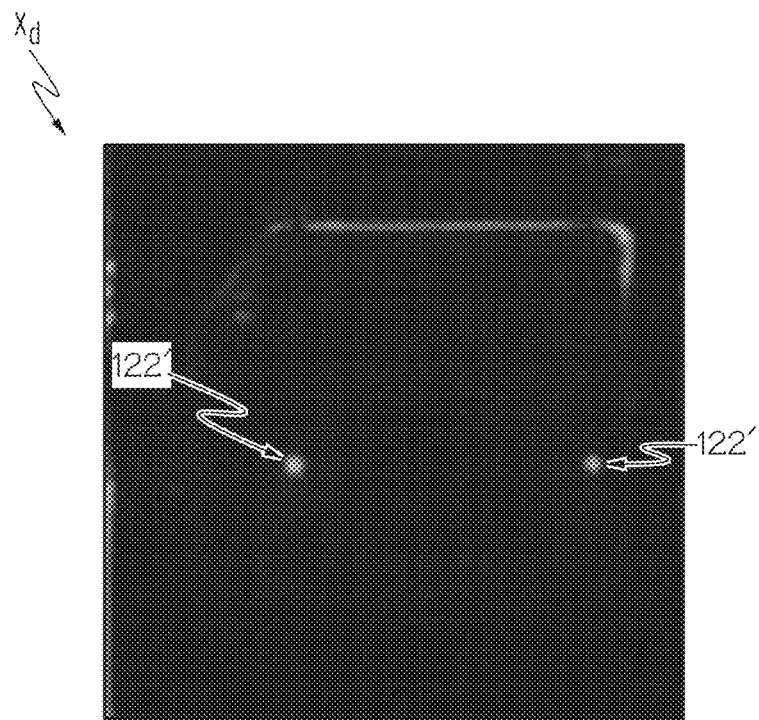
FIG. 2C is a difference image that is the difference between the first image of FIG. 2A and the second image of FIG. 2B according to one or more embodiments described and illustrated herein.

FIG. 2C illustrates an example difference image $X_d$ generated from the first image $X_t$ of FIG. 2A and the second image $X_{t+1}$ of FIG. 2B. As expected, pixels representing regions of the signal lights 122' are contrasted against the other pixels in the difference image $X_d$ because the signal lights 122 are off in FIG. 2A and on in FIG. 2B.

Referring once again to FIG. 1, the difference image $X_d$ is used to calculate a probability of the state of the signal lights. The signal lights may be, without limitation, brake, left turn signal, right turn signal, hazard lights, or off. The probability of the state of the signal lights may be calculated using a machine learning model. The model may be trained on training difference images or the different possible states of the signal lights. The state having the highest probability may be selected as the selected state of the signal lights. Once the state of the signal lights is selected, the autonomous vehicle may operate the vehicle based on the selected state at block 110. For example, when hazard lights are selected as the state of the signal lights such as in FIGS. 2A-2C, the autonomous vehicle may be operated to slow down and approach the truck with caution, much like a human driver would do.

The calculation of the probability of the state of the signal lights and the ultimate selection of a selected state of the signal lights may be performed by a classifier module. The classifier module may be a machine learning module that can correctly classify an incoming difference image into the correct state of signal lights. In some embodiments, the classifier module is comprised of a convolutional neural network and a recurring neural network.

Referring now to FIG. 3, a non-limiting example classifier module defined by a convolutional neural network module 140, a long short-term memory module 142, and a classifier 144 is illustrated. The convolutional neural network number 140, the long short-term memory module number 142, and the classifier 144 are configured to classify incoming images. Additional information regarding the convolutional neural network module 140, a long short-term memory module 142, and the classifier 144 may be found in U.S. Pat. No. 10,691,962, which is hereby incorporated by reference in its entirety. Generally, the convolutional neural network module 140 includes a plurality of filter layers that filter for a plurality of spatial features. The output of the convolutional neural network module 140 is an output layer comprising the plurality of spatial features.

The output of the convolutional neural network module 140 is provided as an input to the long short-term memory module 142. Thus, the long short-term memory module 142 receives as input the plurality of spatial features. For each spatial feature provided as input, the long short-term memory module 142 produces a probability for each potential state of signal lights. The long short-term memory module 142 therefore produces a set of probabilities regarding the state of signal lights for each spatial feature provided as input. For example, for a first spatial feature the output may be 0 for off, 0.1 for left turn signal, 0.1 for right turn signal, and 0.8 for hazard lights. In this case, the state of hazard lights being on has the highest probability.

The output of the long short-term memory module 142 is provided to a classifier 144. The classifier 144 selects the state of signal lights having a highest probability among all of the probabilities for the plurality of spatial features. In the example illustrated by FIG. 2C, for each spatial feature it is likely that the long short-term memory module 142 calculated the highest probability as being hazard lights for the state of signal lights. This selected state may be then used by the autonomous vehicle in any manner.

The workflow illustrated by FIG. 3 provides a system that is trainable end-to-end. Various losses may be calculated at different points in the workflow. The photometric loss $\mathcal{L}_{photometric}(x_t, x_{t+1}, \text{flow})$ following the warping process by meshgrid module 136 may be calculated (e.g., by structural similarity (SSIM)). Typically the photometric loss is used to optimize the optical flow process and warping process. However, in this application, when training the system for classification of signal light state, the photometric loss may also be used to optimize the classification process. Alternatively or additionally, the cross entropy loss $\mathcal{L}_{class}(c,g)$ at the output of the long short-term memory module 142 may be calculated and used for training purposes. The cross entropy loss may be calculated for each spatial feature provided as input to the long short-term memory module 142. These and potentially other losses may be used for end to end training of the system for detecting the state of signal lights.

Accordingly, the example flowchart 100 and workflow 130 provide a system and method for automatically detecting the state of signal lights without relying on SIFT and calculating regions of interests of images. Thus the systems and methods of the present disclosure are much faster and less computationally than previous methods of automatically detecting the state of signal lights.

Figure 4:
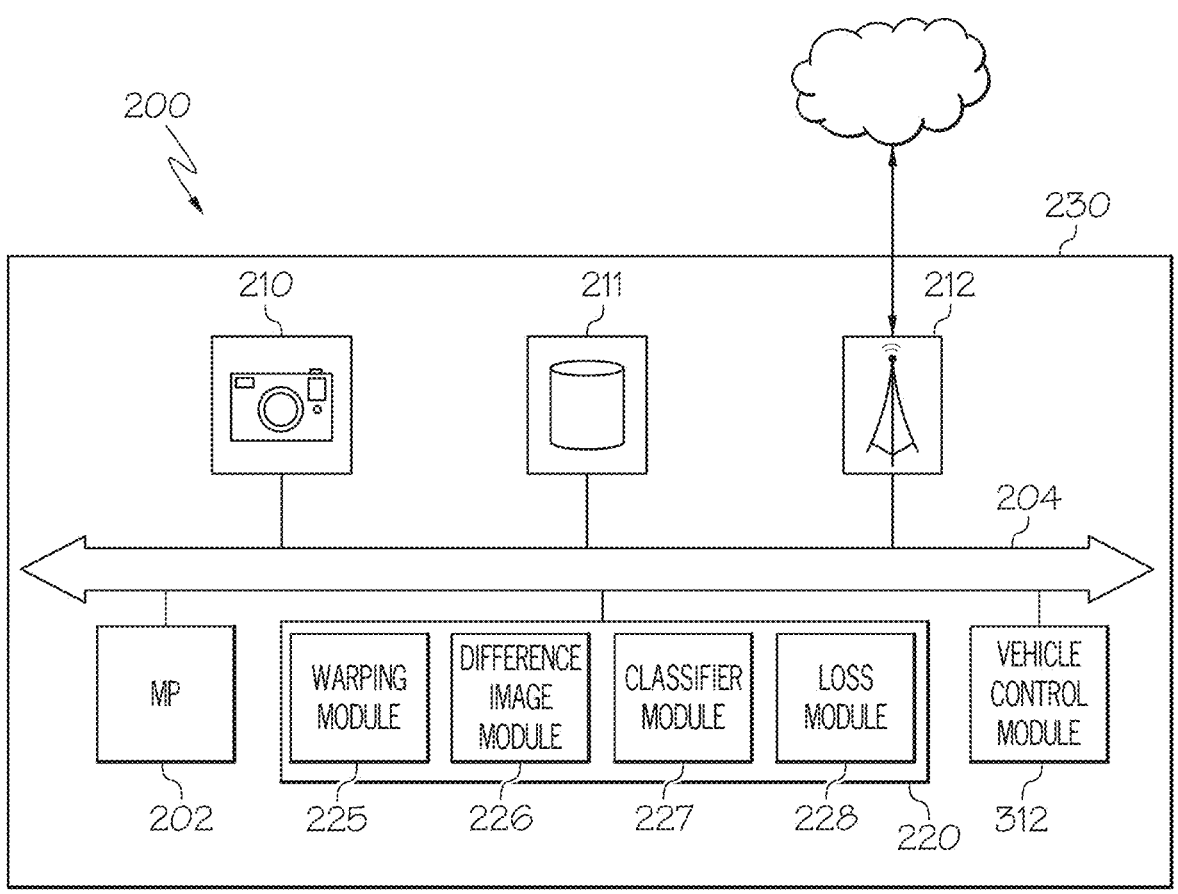
FIG. 4 schematically depicts an example computer system for automatically detecting a state of a signal light of a vehicle according to one or more embodiments described and illustrated herein.

FIG. 4 depicts an example computing system 230 for performing the functionalities as described herein. The computing system 230 may be incorporated into a vehicle 200 itself or a separate hardware device or devices that may be used by the vehicle. The example computing system 230 of the vehicle 200 (or other device(s)) includes one or more processors 202, a communication path 204, one or more memory modules 220, one or more sensors 210, network interface hardware 212, and a data storage device 211, the details of which will be set forth in the following paragraphs. It should be understood that the computing system 230 of FIG. 4 is provided for illustrative purposes only, and that other computing systems comprising more, fewer, or different components may be utilized.

The one or more sensors 210 may include one or more cameras that are operable to take the sequence of images used to generate the difference image for signal light classification.

Each of the one or more processors 202 may be any device capable of executing computer readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the computing system 230. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The computing system 230 includes one or more memory modules 220 coupled to the communication path 204. The one or more memory modules 220 may comprise RAM, ROM, flash memories, hard drives, or any device capable of storing computer readable and executable instructions such that the computer readable and executable instructions can be accessed by the one or more processors 202. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored on the one or more memory modules 220. Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory modules 220 include logic in the form of computer readable instructions that perform the functionalities described herein, such as warping module 225 for generating a synthetic image (e.g., optical flow and warping), difference image module 226 for calculating a difference image, a classifier module 227 for classifying the difference image as a particular signal light state, a loss module 228 for calculating various losses of the signal light state detection workflow, and vehicle control module 312 (which may include a drive system (e.g., internal combustion engine or electric motors) for operating the vehicle 200 based on a detected signal light state of a vehicle. Additional logic used to support these functionalities may be stored in the one or more memory modules 220 and/or in remote memory modules.

The data storage device 211, which may generally be a storage medium, may contain one or more data repositories for storing data that is received and/or generated, and may be any physical storage medium, including, but not limited to, a hard disk drive (HDD), memory, removable storage, and/or the like. While the data storage device 211 is depicted as a local device, it should be understood that the data storage device 70 may be a remote storage device, such as, for example, a server computing device or the like. In some embodiments, the data storage device stores information for performing the functionalities described herein. It should be understood that the data storage device is not provided in some embodiments.

Still referring to FIG. 4, the computing system 230 may comprise network interface hardware 212 for communicatively coupling the computing system 230 to a remote computing device. The network interface hardware 212 can be communicatively coupled to the communication path 204 and can be any device capable of transmitting and/or receiving data via a network 440. Accordingly, the network interface hardware 212 can include a communication transceiver for sending and/or receiving wireless communications. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In some embodiments, the network interface hardware 212 is configured to communicate with remote computing devices by V2I and/or vehicle-to-vehicle (V2V) communication protocols.

It should now be understood that embodiments of the present disclosure are directed to vehicles, methods and systems for automatically detecting that state of signal lights of vehicles surrounding an ego vehicle. The embodiments of the present disclosure are fast and less computationally expensive because the calculations are made in real-time and do not utilize SIFT or calculation of regions of interest within images. In embodiments, one of two successive images are warped so that its pixels have the same location of corresponding pixels of the other image. A difference image is determined and provided to a trained classifier that selects a state of the signal lights. An autonomous vehicle having the functionalities described herein may automatically detect the state of signal lights of other vehicles on the road, and therefore interpret the intent of the other vehicles. The autonomous vehicle may use this information to control its operation, such as its driving operation, in response to the intent of the other drivers or vehicles.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A signal light state detection system comprising:
one or more processors; and
a non-transitory memory module storing computer-readable instructions configured to cause the one or more processors to:
receive a first image of a vehicle and receiving a second image of the vehicle, wherein the second image is later in time from the first image;
generate a warped image from one of the first image and the second image, wherein the warped image has individual pixels of one of the first image and the second image that are shifted to locations of corresponding pixels of the other of the first image and the second image such that the individual pixels of the warped image are aligned with the individual pixels of the other of the first image and the second image;
generate a difference image from the warped image and one of the first image and the second image; and
determine, using a classifier module, a probability of a state of vehicle signal lights.

2. The signal light state detection system of claim 1, wherein generating the warped image comprises shifting individual pixels of the first image to locations of corresponding pixels of the second image.

3. The signal light state detection system of claim 1, wherein generating the warped image comprises:
calculating an optical flow from the first image and the second image; and
shifting individual pixels of one of the first image and the second image based at least in part on the optical flow.

4. The signal light state detection system of claim 3, wherein the optical flow is calculated by PWCNet.

5. The signal light state detection system of claim 1, wherein the classifier module comprises:
a convolutional neural network producing a plurality of spatial features;
a long short-term memory module that receives the plurality of spatial features of the convolutional neural network as input and outputs a probability of the state of vehicle signal lights for each spatial feature; and
a classifier that receives the probability of the state of vehicle signal lights and selects the state of vehicle signal lights of a spatial feature having a highest probability as a selected state of vehicle signal lights.

6. The signal light state detection system of claim 5, calculating a cross entropy loss for the probabilities of the state of vehicle signal lights for the plurality of spatial features.

7. The signal light state detection system of claim 1, calculating a photometric loss of between the warped image and one of the first image and the second image.

8. The signal light state detection system of claim 1, wherein:
the vehicle further comprises a drive system; and
the computer-readable instructions further cause the one or more processors to control the drive system according to the probability of the state of vehicle signal lights.

9. A vehicle comprising:
one or more processors; and
a non-transitory memory module storing computer-readable instructions configured to cause the one or more processors to:
receive a first image of a road vehicle and receiving a second image of the vehicle, wherein the second image is later in time from the first image;
generate a warped image from one of the first image and the second image, wherein the warped image has individual pixels of one of the first image and the second image that are shifted to locations of corresponding pixels of the other of the first image and the second image such that the individual pixels of the warped image are aligned with the individual pixels of the other of the first image and the second image;
generate a difference image from the warped image and one of the first image and the second image; and
determine, using a classifier module, a probability of a state of vehicle signal lights.

10. The vehicle of claim 9, wherein generating the warped image comprises shifting individual pixels of the first image to locations of corresponding pixels of the second image.

11. The vehicle of claim 9, wherein generating the warped image comprises:
calculating an optical flow from the first image and the second image; and
shifting individual pixels of one of the first image and the second image based at least in part on the optical flow.

12. The vehicle of claim 11, wherein the optical flow is calculated by PWCNet.

13. The vehicle of claim 9, wherein the classifier module comprises:
a convolutional neural network producing a plurality of spatial features;
a long short-term memory module that receives the plurality of spatial features of the convolutional neural network as input and outputs a probability of the state of vehicle signal lights for each spatial feature; and
a classifier that receives the probability of the state of vehicle signal lights and selects the state of vehicle signal lights of a spatial feature having a highest probability as a selected state of vehicle signal lights.

14. The vehicle of claim 9, wherein:
the vehicle further comprises a drive system; and
the computer-readable instructions further cause the one or more processors to control the drive system according to the probability of the state of vehicle signal lights.

15. A method of detecting a state of vehicle signal lights, the method comprising:
receiving a first image of a vehicle and receiving a second image of the vehicle, wherein the second image is later in time from the first image;
generating a warped image from one of the first image and the second image, wherein the warped image has individual pixels of one of the first image and the second image that are shifted to locations of corresponding pixels of the other of the first image and the second image such that the individual pixels of the warped image are aligned with the individual pixels of the other of the first image and the second image;
generating a difference image from the warped image and one of the first image and the second image; and
determining, using a classifier module, a probability of a state of vehicle signal lights.

16. The method of claim 15, wherein generating the warped image comprises shifting individual pixels of the first image to locations of corresponding pixels of the second image.

17. The method of claim 15, wherein generating the warped image comprises:
calculating an optical flow from the first image and the second image; and
shifting individual pixels of one of the first image and the second image based at least in part on the optical flow.

18. The method of claim 15, wherein the classifier module comprises:
a convolutional neural network producing a plurality of spatial features;
a long short-term memory module that receives the plurality of spatial features of the convolutional neural network as input and outputs a probability of the state of vehicle signal lights for each spatial feature; and
a classifier that receives the probability of the state of vehicle signal lights and selects the state of vehicle signal lights of a spatial feature having a highest probability as a selected state of vehicle signal lights.

19. The method of claim 18, calculating a cross entropy loss for the probabilities of the state of vehicle signal lights for the plurality of spatial features.

20. The method of claim 15, calculating a photometric loss of between the warped image and one of the first image and the second image.

* * * * *